(12) United States Patent
Mercier et al.

(10) Patent No.: US 8,836,226 B2
(45) Date of Patent: Sep. 16, 2014

(54) LEADING-EDGE PHASE-CUT BLEEDER CONTROL

(71) Applicant: NXP B.V., Eindhoven (NL)

(72) Inventors: Frederic Mercier, Saint Manvieu-Norrey (FR); David Derrien, Cormelles le Royal (FR); Thibault Perquis, Saint Pierre-du-Bu (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/712,572

(22) Filed: Dec. 12, 2012

(65) Prior Publication Data

US 2014/0001979 A1  Jan. 2, 2014

(30) Foreign Application Priority Data

Dec. 21, 2011  (EP) ..................................... 11290587

(51) Int. Cl.
  *H05B 37/02* (2006.01)
  *H05B 33/08* (2006.01)
  *H02M 3/335* (2006.01)

(52) U.S. Cl.
  CPC ............ *H05B 37/02* (2013.01); *H05B 33/0809* (2013.01); *H02M 3/33507* (2013.01)
  USPC .............................. 315/194; 315/219; 315/291

(58) Field of Classification Search
  CPC ........ H05B 37/02; H05B 41/00; H05B 41/14; H05B 41/16; H05B 41/26; H05B 41/36; H05B 41/38; H05B 41/392; H05B 41/3924; H05B 33/08; H02M 7/00; H02M 7/02

USPC .............................. 315/194, 209 R, 219, 291
See application file for complete search history.

(56) References Cited

U.S. PATENT DOCUMENTS

| 2010/0259196 A1* | 10/2010 | Sadwick et al. | 315/309 |
| 2011/0291587 A1* | 12/2011 | Melanson et al. | 315/291 |
| 2012/0056553 A1* | 3/2012 | Koolen et al. | 315/291 |
| 2013/0300303 A1* | 11/2013 | Liu | 315/200 R |

FOREIGN PATENT DOCUMENTS

| EP | 2 257 124 A1 | 12/2010 |
| WO | 2010/150183 A1 | 12/2010 |
| WO | 2011/013060 A2 | 2/2011 |

OTHER PUBLICATIONS

Extended European Search Report for application No. 11290587.2 (Jul. 10, 2012).

* cited by examiner

*Primary Examiner* — Thuy Vinh Tran

(57) ABSTRACT

A bleeder arrangement for a phase-cut circuit for a high-impedance load and having a leading-edge phase-cut device is disclosed, the bleeder arrangement comprising: a controllable current sink adapted to sink a latching current through the leading-edge phase-cut device, and a controller for controlling the controllable current sink, wherein the controller is configured to disable the current sink after the leading-edge phase phase-cut device has latched in at least two stages. A controller for use in such an arrangement is also disclosed, as is a method of controller such a bleeder arrangement.

12 Claims, 3 Drawing Sheets

LEADING-EDGE PHASE-CUT BLEEDER CONTROL

CROSS-REFERENCE TO RELATED APPLICATIONS

This application claims the priority under 35 U.S.C. §119 of European patent application no. 11290587.2, filed on Dec. 21, 2011, the contents of which are incorporated by reference herein.

FIELD OF THE INVENTION

This invention relates to bleeder arrangements for phase-cut circuits, for high-impedance loads and having a leading-edge phase-cut device. It further related to controllers in and for such bleeder arrangements, and to methods of controlling such bleeder arrangements.

BACKGROUND OF THE INVENTION

There is a very wide installed base of dimmer circuits in mains lighting arrangements. The vast majority of dimmer circuits use phase-cut dimmers, in which power is supplied to the lighting unit during only one part of the mains phase; the power being cut during the remainder. The cut part may either be the trailing part of the phase: such trailing-edge phase cut dimmers normally have a transistor to cut the phase; alternatively the cut part may be the leading part of the phase; such leading-edge phase cut dimmers are more common and normally use a triac to cut the phase.

In order to operate properly, the triac requires a certain level of current (so-called sync or synchronisation current) through it during the first (cut) part of the phase, in order to determine when to switch on, at a predetermined switch-on voltage; also, and more significantly, the triac requires a (generally higher) latching current through it whilst it switches and settles to an on-state. In order to ensure that it remains on for the remainder of the phase, a third current called a holding current is required.

This is illustrated in FIG. 1 which shows two part-rectified mains half-cycles 110 (shown partially dotted), and the voltage shape 120 of the voltage supplied to the load. The voltage shape 120 includes an initially off period 122, and a rising leading-edge 124. The lower part of the figure shows the current 130 through the device which is required to properly operate the triac. This includes a synchronization current 132 during the initial (cut) part of the phase; a latching current 134 around the leading-edge; and a hold current 136 throughout remainder of the mains half cycle.

Conventional incandescent lighting units generally have a low impedance, and thus the current through them is sufficiently high to meet the current requirements 130 of the dimmer. However, modern forms of lighting such a compact fluorescent (CFL) and light-emitting diode (LED) are generally more efficient, and in particular offer a high impedance, such that for lighting sources such as LEDs in particular, it is no longer the case that the lighting unit will sink sufficient to ensure that the triac properly operates. High impedance lighting sources are thus generally not compatible with conventional triac-based dimming units without modification.

It is known to provide a so-called bleeder circuit in parallel with the lighting unit in order to sink current and ensure the triac operates correctly. Such bleeder circuits are known, for instance NXP™ SSL 210x series of LED lighting controllers. Since such a bleeder circuit does not directly contribute to the luminous output of the LEDs lighting, it represents a source of loss; it is known to disable the bleeder during part of the mains phase when it is not required.

It will be appreciated that, although mains lighting is one example of an application which can be used with a phase cut dimmer, the invention is not limited thereto, but extends to other applications operable with a leading-edge phase cut dimmer, such as, for instance cooling fans.

SUMMARY OF THE INVENTION

According to a first aspect there is provided a bleeder arrangement for a phase-cut circuit for a high-impedance load and having a leading-edge phase-cut device, the bleeder arrangement comprising: a controllable current sink adapted to sink a latching current through the leading-edge phase-cut device, and a controller for controlling the controllable current sink, wherein the controller is configured to disable the current sink after the leading-edge phase phase-cut device has latched in at least two stages. The leading-edge phase-cut device is latched by means of the latching current. Such an arrangement can provide an improved bleeder functionality, which may suffer to a lesser extent, or not at all, from inductive oscillations upon switch-off.

In embodiments, the controller is configured to start to disable the current sink between 100 μs and 200 μs following the leading edge. This may provide sufficient time for the triac to settle and latch into its on-state.

In embodiments, the at least two stages is two stages, and the first stage comprises an immediate reduction in current through the current sink to an intermediate level and the second stage comprises a gradual reduction in the current through the current sink to zero. The intermediate level is between 40% and 60% of the latching current.

In embodiments, the gradual reduction is a linear reduction lasting between 100 μs and 300 μs. This may provide a particular simple arrangement to implement within a controller the range 100 μs to 300 μs is not exhaustive, and the reduction may last for a different time; in general this may depend on the value of the current initially. In other embodiments, the gradual reduction is an exponential reduction, and the current falls to less than 10% of the intermediate level over a time, which is for instance between 100 μs and 300 μs.

According to another aspect there is provided a controller configured to be used as the controller comprised in a bleeder arrangement as described above, and according to a further aspect there is provided a lighting circuit comprising a bleeder arrangement as claimed in any previous claim, wherein the high impedance load is a lighting unit.

According to a yet further aspect there is provided a method of controlling a bleeder for a phase-cut circuit for a high-impedance load and having a leading-edge phase-cut device, the method comprising sinking a controllable latching sink current through the leading-edge phase-cut device, and disabling the sink current after the leading-edge phase phase-cut device has latched in at least two stages.

In embodiments, disabling the current sink is started between 100 μs and 200 μs following the leading edge.

In embodiments, the at least two stages is two stages. In embodiments, the first of the two stages comprises reducing the sinking current to an intermediate level. In embodiments, the second stage is a gradual reduction from the intermediate level to zero.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
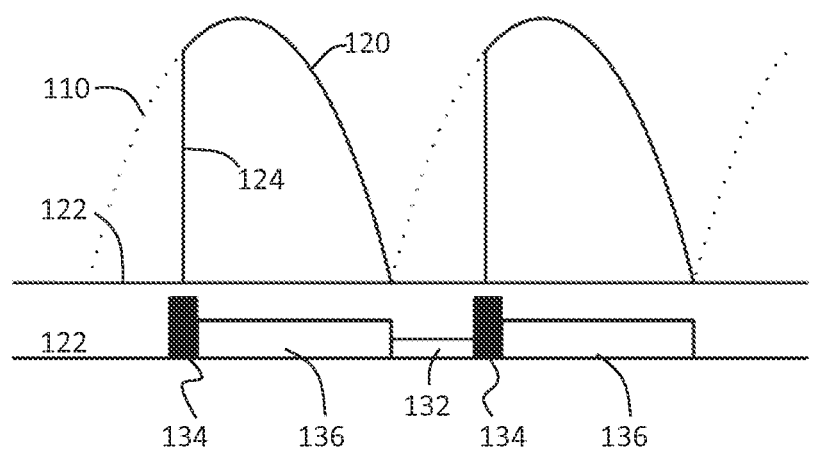
FIG. 1 shows voltages and required current for a leading-edge phase cut dimmer over mains phases.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 2:
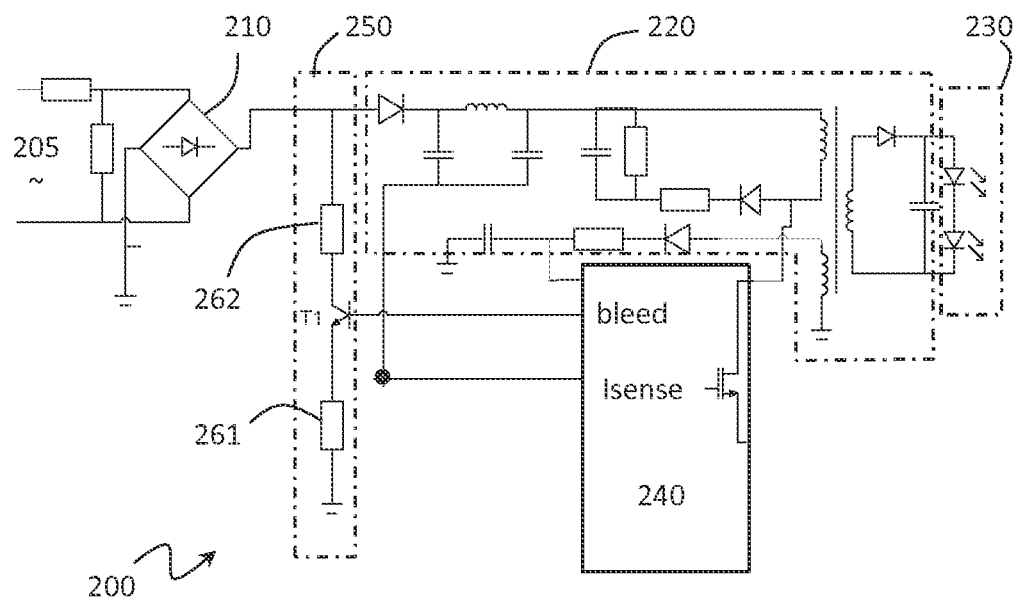
FIG. 2 is a schematic circuit diagram of a bleeder arrangement in a lighting circuit.

FIG. 2 shows a schematic circuit diagram of a bleeder arrangement in a lighting circuit. The circuit 200 shows a phase-cut mains input 205 which is rectified by rectifier 210. The rectified voltage is converted by means of a switched mode power converter (SMPC) 220 to provide the DC current supply to lighting unit 230. The SMPC is controlled by controller 240. Controller 240 also controls the bleeder circuit 250. The bleeder circuit 250 comprises a pair of resistors 261 and 262, and a bipolar transistor T1. The gate of transistor T1 is controlled by the controller such that the bleeder circuit comprises a controllable current sink.

In conventional bleeder circuits, the bleeder is enabled during a first part of the phase. Before the triac latches on, the output voltage is low, and thus the bleeder current is correspondingly low; however, it is sufficient to establish the synchronisation current 132. When the leading-edge is reached, the triac switches on, the output voltage rises, and the bleeder provides a higher current—the latch current. In practice, typically the latching current is set in advance of the leading edge, as shown in FIG. 2; however, during the initial phase cut period the voltage across the current is low, so the current source is saturated and the current is limited, so that the full latching current only flows once the leading edge is reached. Once the triac has latched on, the latch current 134 is no longer required, and only a lower hold current 136 is needed. This hold current may be supplied by the LED lighting application itself, or may be supplied by a second, low-current bleeder, also known as a weak bleeder which remains permanently on. The bleeder may thus be switched off, once the triac has latched on.

Figure 3:
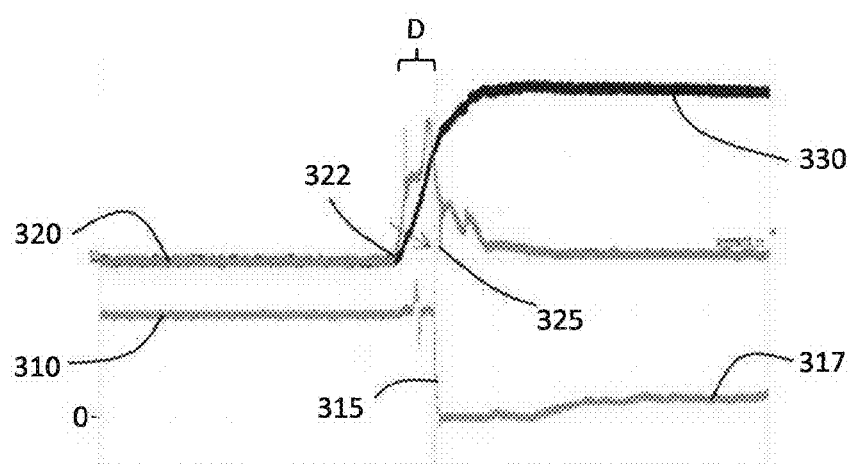
FIG. 3 shows experimental results according to known bleeder circuits.

This is illustrated in FIG. 3, which shows experimental results according to known bleeder circuits. The bleeder current is shown at trace 310, and the triac output current at 320. The triac output voltage is shown at 330. In this instance oscillations are shown at 325 due to the switching off of the bleeder current at 315, after the leading edge 322, following a fixed delay D. As shown, the oscillations do not quite reach zero, and so the operation of the triac, and in particular its latching, is not interrupted. However, it will be appreciated that depending on the specific circuit, the oscillations 325 may cause the current to fall to or below zero in which case the triac may become unlatched and switch off.

Figure 4:
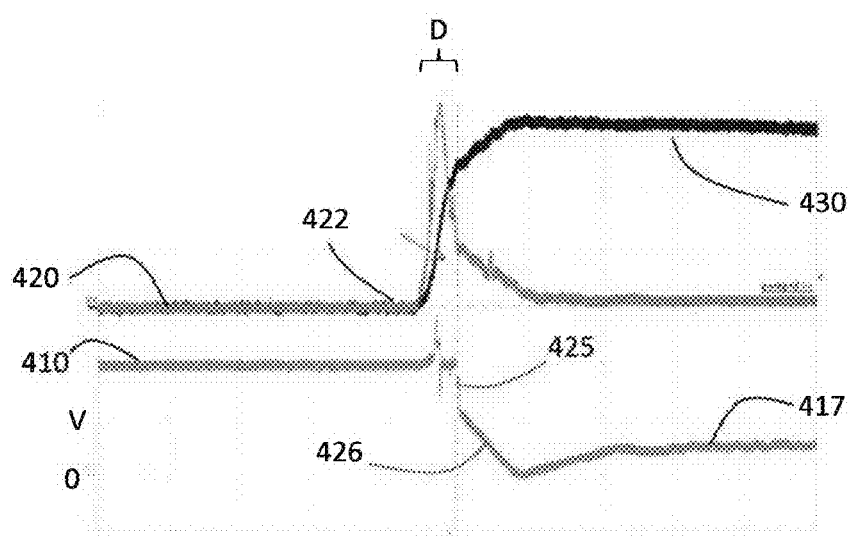
FIG. 4 shows experimental results according to embodiments.

In order to avoid the above problems, according to embodiments, the bleeder is switched off in at least two stages. This is illustrated in FIG. 4 which shows experimental results according to embodiments. The bleeder current is shown at trace 410, and the triac output current at 420. The triac output voltage is shown at 430. In this case, after the delay D, the bleeder current is not completely switched off at 425 but set to a lower value V; it is then gradually decreased as shown at 426 towards zero. (As shown on both FIGS. 3 and 4, at 317 and 417 respectively, in this implementation, once the bleeder current has reached zero, it gradually rises due to the fact that the current sunk by the converter is not strong enough to provide the holding current. A weak, or low current, bleeder is then activated to maintain the holding current. In other embodiments which sink more current, this weak bleeder could stay off).

Figure 5:
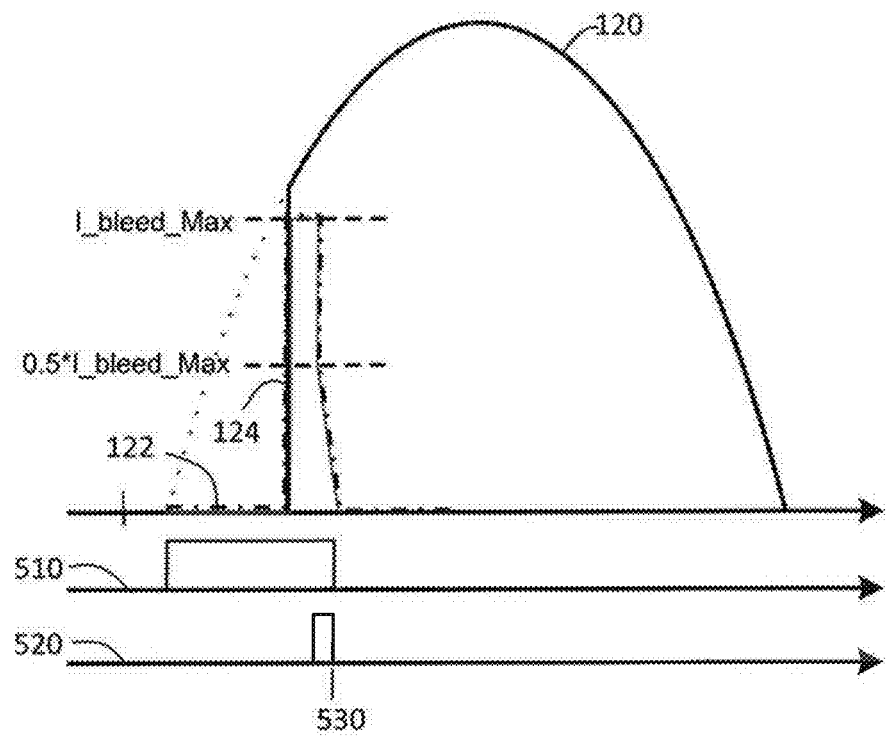
FIG. 5 shows voltages and currents according to embodiments.

FIG. 5 shows voltages and currents according to embodiments, in order to achieve the experimental results shown in FIG. 4. The figure shows the same leading-edge dimmed voltage shape 120 as shown in FIG. 1 with phase cut first part 122 followed by the rise at edge 124. Curve 510 indicates when the enable bleeder is enabled and curve 520 shows a soft-stop enable signal. As can be seen, the bleeder is enabled from the start of the phase until a specific moment 530, which will be considered in more detail below.

At the end of a delay following the rising edge, a soft-stop enable function 520 is turned on. The delay may typically be between 100 and 300 μs although values outside this range are not excluded, and in particular may be 150 μs. Such a delay is helpful to ensure a good ignition of the triac and to ensure that the device has properly latched on. The soft stop enable signal 520 initiates the soft stop function whereby the bleeder current is reduced to 0 but at the same time oscillations due to a sudden turn off are prevented. The soft-stop is a multistage function. In the example shown on FIG. 5 the soft-stop has two stages: the first stage occurs immediately soft-stop 520 is enabled, and this comprises a reduction in the bleeder current from its maximum to an intermediate value. In the example shown in FIG. 5 the intermediate value is 50% of the maximum value I_bleed_Max, that is to say the intermediate value is 0.5*I_bleed_Max. By immediately reducing the bleeder current to an intermediate value, which may typically be between 40% and 60% of its maximum value, the losses associated with the bleeder current are kept low. Thereafter, in later stages of the soft stop, the bleeder current is gradually reduced to zero. In the example shown in FIG. 5, this is a single second stage, during which the current is linearly reduced from its intermediate value to zero. This provides for a particularly simple implementation, which is conveniently designed into the controller. However, there is no limitation to a linear reduction, and in other embodiments, other forms of reduction may be used: for example, an exponential reduction in the bleeder current may be provided or a part-exponential followed by a simple switch-off. Conveniently, the control is arranged so the specific moment 530 at the end of the bleeder enablement is coincident with the end of the soft-stop 520.

Figure 6:
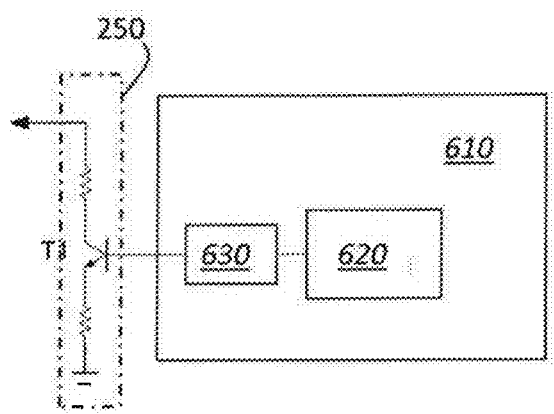
FIG. 6 is an illustrative schematic showing a controllable bleeder circuit.

FIG. 6 is an illustrative schematic showing a controllable bleeder circuit. The circuit shows an IC 610, which may comprise the controller 240, which includes a digital control block 620. Digital output from digital control block 620 is converted into an analog signal by digital-to-analog converter (DAC) 630. The analogue signal is used to control the gate of bipolar transistor T1 which forms part of the bleeder circuit 250. It will be appreciated that, although the controller shown in FIG. 6 is digital, the invention is not limited thereto, and the soft-stop functionality could be provided by means of analog circuitry and signals.

It will be appreciated that although embodiments have been described with respect to the phase of the mains, the invention is not limited to mains NC supplies, but extends to other A/C supplies, such as an NC supply produced by an inverter for non-mains connected equipment and installations.

From reading the present disclosure, other variations and modifications will be apparent to the skilled person. Such variations and modifications may involve equivalent and other features which are already known in the art of phase-cut dimmer-controlled circuits, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A bleeder arrangement for a phase-cut circuit for a high-impedance load and having a leading-edge phase-cut device, the bleeder arrangement comprising:
   a controllable current sink adapted to sink a latching current through the leading-edge phase-cut device,
   and a controller for controlling the controllable current sink,
   wherein the controller is configured to disable the current sink, after the leading-edge phase phase-cut device has latched, in at least two stages.

2. A bleeder arrangement according to claim 1, wherein the controller is configured to start to disable the current sink between 100 μs and 200 μs following the leading edge.

3. A bleeder arrangement according to claim 1, wherein the at least two stages is two stages, and wherein the first stage comprises an immediate reduction in current through the current sink to an intermediate level and the second stage comprises a gradual reduction in the current through the current sink to zero.

4. A bleeder arrangement according to claim 3, wherein the intermediate level is between 40% and 60% of the latching current.

5. A bleeder arrangement according to claim 3, wherein the gradual reduction is a linear reduction lasting between 100 μs and 300 μs.

6. A bleeder arrangement according to claim 3, wherein the gradual reduction is an exponential reduction, and the current falls to less than 10% of the intermediate level over between 100 μs and 300 μs.

7. A lighting circuit comprising a bleeder arrangement as claimed in claim 1, wherein the high impedance load is a lighting unit.

8. A method of controlling a bleeder for a phase-cut circuit for a high-impedance load and having a leading-edge phase-cut device, the method comprising
   sinking a controllable latching sink current through the leading-edge phase-cut device, and disabling the sink current after the leading-edge phase phase-cut device has latched in at least two stages.

9. A method of claim 8, wherein disabling the current sink is started between 100 μs and 200 μs following the leading edge.

10. The method of claim 8, wherein the at least two stages is two stages.

11. The method of claim 10, wherein the first of the two stages comprises reducing the sinking current to an intermediate level.

12. The method of claim 10, wherein the second stage is a gradual reduction from the intermediate level to zero.

* * * * *